July 1, 1958      D. W. McDANIEL      2,841,444
WHEEL MOUNTING
Filed Jan. 11, 1955
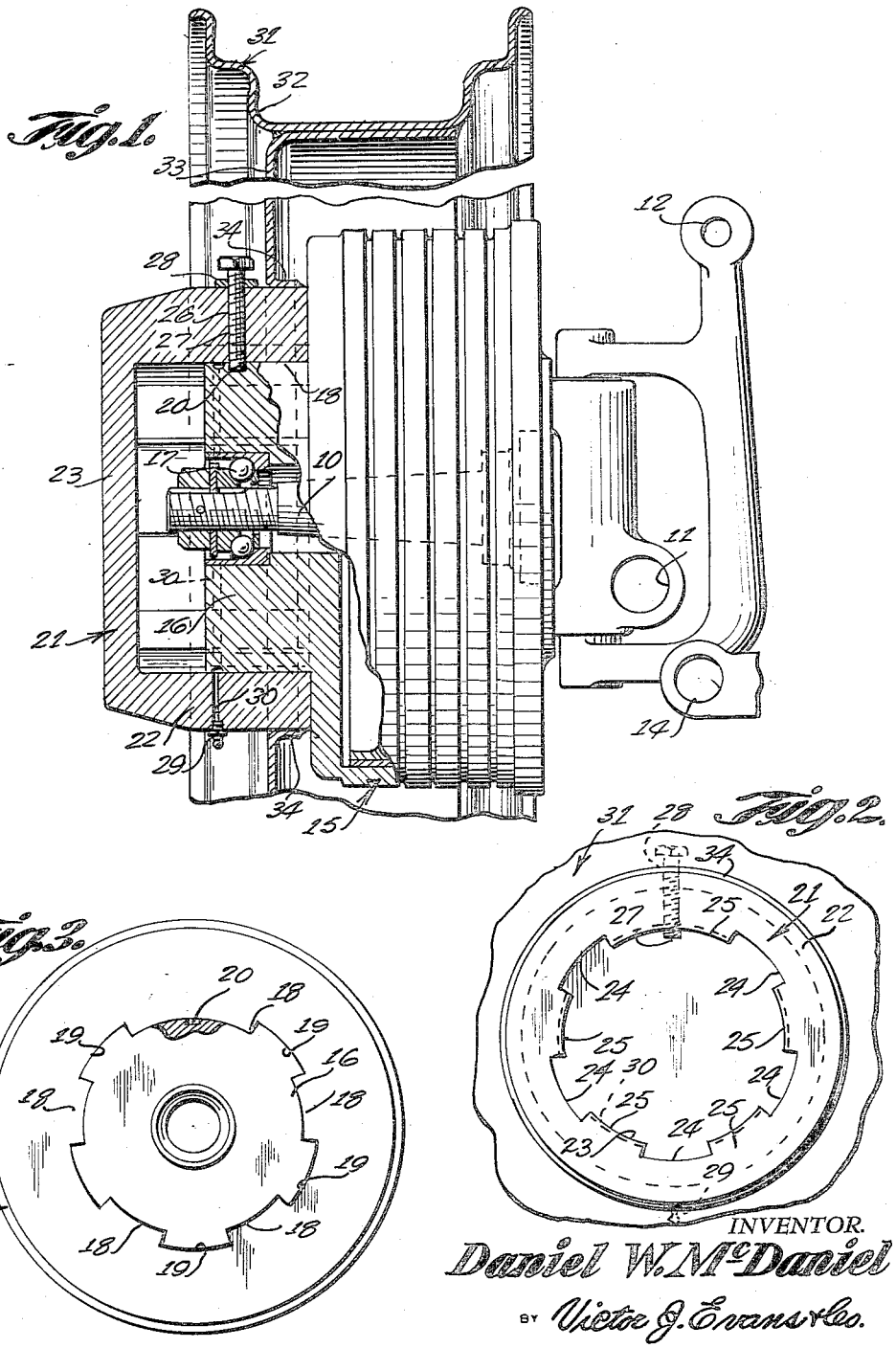
INVENTOR.
Daniel W. McDaniel
BY Victor J. Evans & Co.
ATTORNEYS

2,841,444
WHEEL MOUNTING

Daniel W. McDaniel, Hemphill, Tex.

Application January 11, 1955, Serial No. 481,153

2 Claims. (Cl. 301—1)

This invention relates to a vehicle, and more particularly to a wheel and hub for a vehicle.

The object of the invention is to provide a vehicle wheel mounting which is ruggedly constructed and wherein the wheel can be easily removed or replaced as desired.

Another object of the invention is to provide a method of mounting a wheel on a hub or supporting member which is much stronger than previous wheel mountings and whereby wheels can be more quickly and easily removed and replaced from their hub.

A further object of the invention is to provide a wheel mounting which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the wheel mounting, with parts broken away and in section.

Figure 2 is a fragmentary elevational view showing the wheel hub.

Figure 3 is a fragmentary end elevational view with parts broken away and in section illustrating the brake drum and support portion.

Referring in detail to the drawings, the numeral 10 designates the usual spindle for a vehicle wheel, and there is provided the usual king pin 11 and upper control arm 12 and lower control arm 14, Figure 1. The numeral 15 designates a brake drum of cylindrical construction which is adapted to be actuated in the usual manner, and extending outwardly from the brake drum 15 is a support portion 16 of cylindrical construction.

The support portion 16 is of smaller diameter than the brake drum 15, and the support portion 16 may be secured to the brake drum 15 or can be formed integral therewith. The support portion 16 is provided with an inner recess which receives therein a ball bearing race 17 that may be mounted on the end of the spindle 10.

The outer surface of the support portion 16 is provided with a plurality of spaced apart recesses 18 which define therebetween ribs 19, and there is provided an aperture 20 in the support portion 16 for a purpose to be later described.

There is further provided a body member which is indicated by the numeral 21 and the body member 21 is detachably mounted on the support portion 16. The body member 21 includes an annular side wall 22 which embraces the support member 16, there being an end wall 23 on the body member 21. The inner surface of the side wall 22 of the body member 21 is provided with a plurality of spaced apart grooves 24, Figure 2, and the grooves 24 define therebetween inwardly projecting tongues 25. When the body member 21 is mounted on the support portion 16, the tongues 25 snugly seat in the recesses 18, and the ribs 19 are snugly seated in the grooves 24 so that the body member 21 and support portion 16 rotate in unison. The side wall 22 is provided with an opening 26 which registers with the aperture 20, and a suitable securing element such as a bolt 27 extends through the registering opening 26 and into engagement with the aperture 20, there being a lock nut 28 mounted on the bolt 27.

A grease fitting 29 is carried by the body member 21 whereby suitable lubricant can be supplied to the interior of the assembly, and a channel 30 may communicate with the fitting 29 for the passage therethrough of oil or grease.

The wheel is indicated generally by the numeral 31, and the wheel 31 includes an annular rim 32. Projecting inwardly from the rim 32 and secured thereto as by welding, is a circular plate or flange 33 which is provided with an inner transverse portion 34 that is secured as by welding to the outer surface of the wall 22 of the body member 21. Thus, by removing the bolt 27, the body member 21 can be pulled off the support portion 16 so that the wheel 31 will be pulled off at the same time. Thus, the wheel can be quickly and easily changed. Due to the intermeshing or interfitting ribs and grooves and tongues and recesses, the support portion 16, body member 21, and wheel 31 will rotate in unison.

From the foregoing it is apparent that there has been provided a wheel mounting which can be used as for example on vehicles. In use the parts are assembled as shown in Figure 1 and the bolt 27 is extended through the registering openings 26 and 20. It is to be noted that with the parts arranged as shown in Figure 1 the tongues 25 project into the recesses 18, while the ribs 19 extend into the grooves 24. Thus, the brake drum 15, support portion 16, body member 21 and wheel 31 will rotate in unison. In the event that the wheel 31 is to be removed, it is only necessary to remove the bolt 27 and then pry off the body member 21 so that the wheel 31 will also be removed.

The present invention is constructed so that the wheel can be easily pulled on or pushed off with a minimum of effort and time. Grease can be supplied for the moving parts through the medium of the fitting 29. The central portion of the support 16 can be recessed to provide clearance for the ball bearing race 17. It is to be noted from Figures 2 and 3 that the recess 18 in the support portion 16 which has the aperture 20 arranged contiguous thereto is wider than the other recesses 18. Similarly, the tongue 25 which has the bolt 27 extending therethrough is wider than the other tongues 25. With the present invention no hub cap is required for the wheel and the other parts of the wheel such as the brake drum are actuated in the same manner as with conventional wheels.

I claim:

1. In combination, a spindle, a ball bearing race mounted on the end of said spindle, a brake drum mounted on said spindle and having a support portion extending outwardly therefrom, said support portion being provided with an inner recess for receiving therein the ball bearing race which is mounted on the end of the spindle, said support portion being of smaller diameter than said brake drum and said support portion being provided on its outer surface with a plurality of spaced apart recesses defining ribs therebetween, a body member detachably mounted on said support portion and including an annular side wall embracing said support portion, and an end wall, the inner surface of said side wall being provided with a plurality of grooves defining inwardly projecting tongues therebetween, said grooves snugly receiving therein said ribs, and said tongues being snugly seated in said recesses, a wheel including an annular rim and a circular flange extending inwardly from said rim, said flange having an inner transverse portion secured to the outer surface of said body member, there being registering apertures in said side wall and support portion, and a securing element extending through said registering apertures, the recess and the support portion which has the aperture arranged contiguous thereto being wider than the other recesses, and the tongue which has the securing element extending therethrough being wider than the other tongues, a grease fitting carried by said body member, there being a channel in said side wall communicating with said grease fitting.

2. In combination, a spindle, a ball bearing race arranged on an end of said spindle, a brake drum positioned on said spindle and including a support portion extending outwardly therefrom, said support portion having an inner recess for receiving therein the ball bearing race that is mounted on the end of the spindle, said support portion being of smaller diameter than said brake drum and said support portion having on its outer surface a plurality of spaced apart recesses defining rims therebetween, a body member detachably positioned on said support portion and embodying an annular side wall embracing said support portion, an end wall, the inner surface of said side wall having a plurality of spaced apart grooves defining inwardly projecting tongues therebetween, said grooves snugly receiving therein said ribs, said tongues being snugly seated in said recesses, a wheel including an annular rim and a circular flange extending inwardly from said rim, said flange having an inner transverse portion secured to the outer surface of said body member, there being registering apertures in said side wall and support portion, a securing element extending through said registering apertures so that by removing the securing element, the body member can be pulled off of the support portion so that the wheel will be pulled off at the same time whereby the wheel can be quickly and easily changed, and due to the intermeshing or interfitting ribs and grooves and tongues and recesses, the support portion, body member, and wheel will rotate in unison, the recess and the support portion which have the aperture arranged contiguous thereto being wider than the other recesses, the tongue which has the securing elements extending therethrough being wider than the other tongues, a grease fitting carried by said body member whereby suitable lubricant can be supplied to the interior of the assembly, there being a channel in said side wall communicating with said grease fitting for the passage therethrough of oil or grease.

References Cited in the file of this patent
UNITED STATES PATENTS

| | | |
|---|---|---|
| 689,308 | Hevenor | Dec. 17, 1901 |
| 1,181,801 | Rees et al. | May 2, 1916 |
| 1,638,741 | McGinniess | Aug. 9, 1927 |
| 1,988,406 | Werner et al. | Jan. 15, 1935 |